United States Patent [19]
Sheller et al.

[11] Patent Number: 5,318,756
[45] Date of Patent: * Jun. 7, 1994

[54] ELECTRODE FEED THROUGH

[75] Inventors: David T. Sheller, Garrettsville; Gordon W. Brunson, Chagrin Falls, both of Ohio

[73] Assignee: W. R. Grace & Co.-Conn., New York, N.Y.

[*] Notice: The portion of the term of this patent subsequent to Aug. 24, 2010 has been disclaimed.

[21] Appl. No.: 931,313

[22] Filed: Aug. 17, 1992

Related U.S. Application Data

[63] Continuation-in-part of Ser. No. 759,172, Sep. 13, 1991, Pat. No. 5,238,650.

[51] Int. Cl.$^5$ .......................... F01N 3/10; H01R 9/00; H01R 13/02
[52] U.S. Cl. ........................ 422/174; 60/300; 219/205; 219/541; 439/519; 439/886; 439/887
[58] Field of Search .............. 422/174; 439/886, 887, 439/890, 519; 219/541, 205; 60/300

[56] References Cited

U.S. PATENT DOCUMENTS

| | | | |
|---|---|---|---|
| 4,499,054 | 2/1985 | Katsura et al. | 422/98 |
| 4,928,485 | 5/1990 | Whittenberger | 422/174 |
| 4,985,313 | 1/1991 | Penneck et al. | 428/674 |
| 5,053,603 | 10/1991 | Wagner et al. | 219/205 |

Primary Examiner—Robert J. Warden
Assistant Examiner—T. A. Trembley
Attorney, Agent, or Firm—Edward J. Cabic

[57] ABSTRACT

There is provided a terminal especially adapted for use with an electrically heatable catalytic converter having a stud, a portion of said stud being coated with a thin layer of refractory metal oxide, and a sleeve having an interference fit with said coated portion of said stud, said stud adapted to be welded at its proximal end to one side of a resistance circuit. There is also provided an electrically heatable catalytic converter including such terminal.

14 Claims, 2 Drawing Sheets

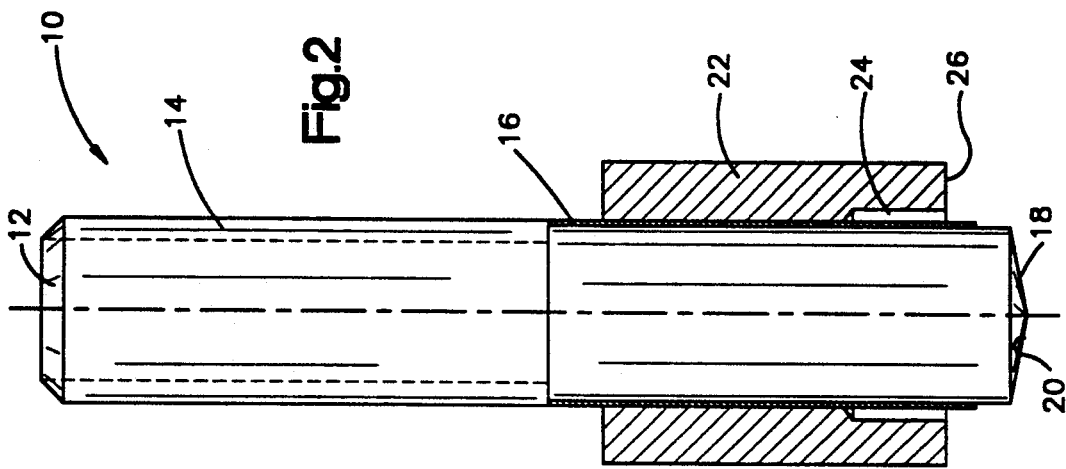
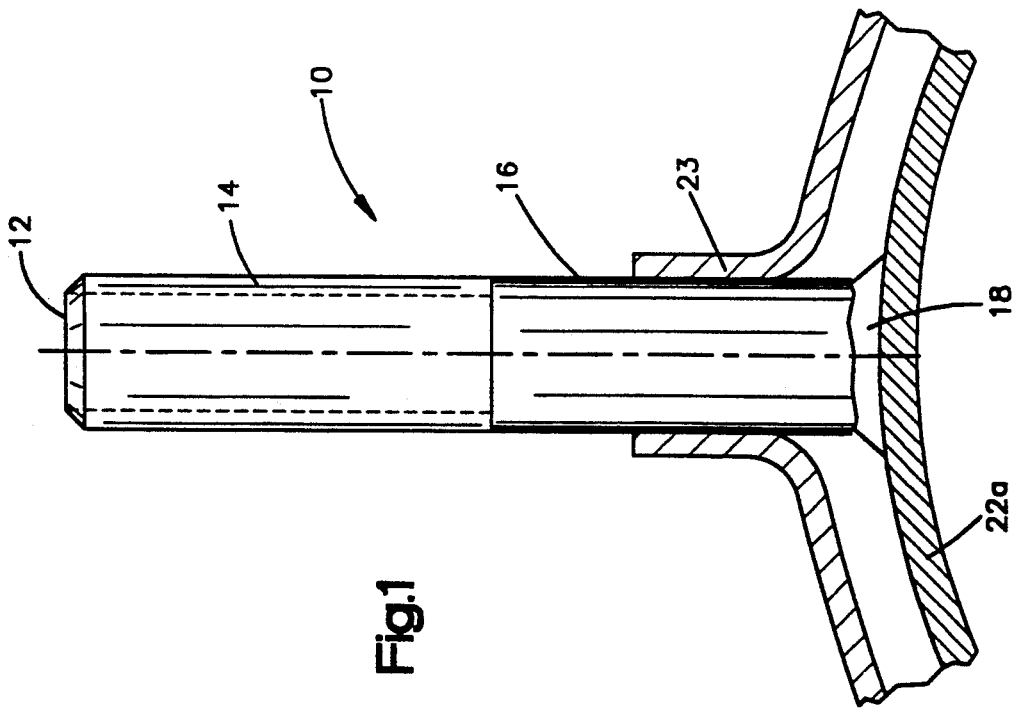

ELECTRODE FEED THROUGH

This is a continuation-in-part of copending application Ser. No. 759,172, filed on Sep. 13, 1991, now U.S. Pat. No. 5,238,650.

This invention relates to an electrode feed through assembly especially adapted for use with an electrically heatable catalytic converter to carry electric current through a surrounding metallic housing to an electrically heatable catalytic converter core without shorting to said housing.

BACKGROUND OF THE INVENTION AND PRIOR ART

The purpose of a catalytic converter is to convert pollutant materials in engine or turbine exhaust, e.g., carbon monoxide, unburned hydrocarbons, nitrogen oxides, etc., to carbon dioxide, nitrogen and water. Conventional catalytic converters utilize an oval cross-section ceramic honeycomb monolith 4 to 8 inches long having square, circular, triangular, or hexagonal axially extending straight through openings or cells with a noble metal catalyst deposited in the cells. Other types of catalytic converters include catalyst coated refractory metal oxide beads or pellets, e.g., alumina beads, and a corrugated thin metal foil monolith, e.g., ferritic stainless steel foil monolith, having a catalyst supported on the surface, usually a refractory metal oxide surface-e. The catalyst is normally a noble metal, e.g., platinum, palladium, rhodium, ruthenium, or a mixture of two or more such metals. The catalyst catalyzes a chemical reaction, mainly oxidation, whereby pollutant materials in the exhaust are converted to harmless by-products which then pass through the exhaust system to the atmosphere.

However, conversion is not efficient initially when the exhaust gases and the converter are relatively cold. To be effective at a high conversion rate, the catalyst and the surface of the converter must be at a minimum temperature, e.g., 390° F. for carbon monoxide, 570° F. for volatile organic compounds (VOC) including unburned hydrocarbons, and 1000° F. for methane or natural gas. Otherwise, conversion to harmless by-products is poor and cold start pollution of the atmosphere is high. Once the exhaust system has come to its operating temperature, the catalytic converter is optimally effective. Hence, it is necessary to contact relatively cold exhaust gases with hot catalyst to effect satisfactory conversion at engine start-up. Both compression ignited and spark ignited internal combustion engines have this need. Gas turbines also have this need.

To achieve initial heating of the catalyst prior to or upon engine start-up, current practice provides an electrically heatable catalytic converter formed usually of a corrugated thin metal foil monolith which is connected to a voltage source, e.g., a 12 volt to 108 volt automotive battery, and power supplied before, or at the time of, and during and after engine ignition to elevate and maintain the temperature of the catalyst to at least 650° F. plus or minus 20° F. The initial heat up time prior to engine ignition is from 2 to 30 seconds, and post crank heating is generally on demand. In some cases, heating is continuous from ignition to shut-down.

The resistance of the corrugated thin metal monolith is used to heat the converter and accordingly electric power must be supplied to the monolith at opposite ends of a corrugated thin metal strip or strips from which the monolith is made. To accomplish this, at least one electrode must extend through the housing and be electrically isolated from the housing. Where only one electrode is used, the housing, being attached to the chassis, becomes the opposite pole of the voltage source. Where two electrodes of opposite charge are used, both must extend, in electrically- isolated manner, through the housing and be attached to the monolith.

With prior insulated terminals or electrodes, gas leakage has occurred and it has now been found desirable to pneumatically seal the electrode or electrodes. Leakage is unacceptable because it causes oxygen sensors in the vehicle's emission system to malfunction.

Reference may be had to U.S. Pat. No. 4,711,009 to Cornelison et al dated Dec. 8, 1987 for details of a process for corrugating and coating thin metal foil strips and applying the catalyst, which process, with or without the final steps of creasing and folding the strip, may be used herein.

In one embodiment, lengths of corrugated strip are secured as by welding to a tubular central core member, closed at at least one end, and spirally wound about the core. The outer ends are brazed to an outer metallic shell.

In the following description, reference will be had to "ferritic" stainless steel. A suitable formulation for this alloy will be found in U.S. Pat. No. 4,414,023 dated Nov. 8, 1983 to Aggen. A specific ferritic stainless steel alloy useful herein contains 20% chromium, 5% aluminum, and from 0.002% to 0.05% of at least one rare earth metal selected from cerium, lanthanum, neodymium, yttrium, praseodymium, and mixtures of two or more thereof, balance iron, and trace steel making impurities.

Another useful alloy is Haynes 214 described in U.S. Pat. No. 4,671,931 dated Jun. 9, 1987 to Herchenroeder and is an alloy of nickel/chromium/aluminum/iron. A specific example contains 75% nickel, 16% chromium, 4.5% aluminum, 3% iron, trace amounts of one or more rare earth metals, 0.05% carbon, and steel making impurities.

Ferritic stainless steel and Haynes 214 are examples of high temperature resistive, corrosion resistant metal alloys useful in making the electrically heatable catalytic converters hereof. Suitable alloys must be able to withstand temperatures of 900° C. to 1100° C. over prolonged periods.

In the following description, reference will also be made to fibrous ceramic mat or insulation. Reference may be had to U.S. Pat. No. 3,795,524 dated Mar. 5, 1974 to Sowman for formulation and manufacture of ceramic fibers and mats useful herein. See also the U.S. Pat. No. 3,916,057 to Hatch dated Oct. 28, 1975. One such ceramic fiber material is currently available from 3-M under the Registered Trademark "NEXTEL" 312 Woven Tape and is especially useful herein. Ceramic fiber mat is available under the Registered Trademark "INTERAM" also from 3-M.

A brazing foil, which is an alloy of nickel, chromium, silicon and boron useful herein is available commercially from Allied Metglas Products of Parsippany, N.J.

BRIEF STATEMENT OF THE INVENTION

Briefly stated, the present invention is a terminal for an electrical connection, comprising a stud, preferably of nickel, nickel alloy, or ferritic stainless steel, a circumferential ceramic coating about an axially extending portion of said stud, and a metallic sleeve, preferably stainless steel, e.g., #304 Stainless, having an interference fit with said ceramic coated portion of said stud to electrically isolate said stud from said sleeve. The sleeve may be a separate metal sleeve welded to the housing, or it may be a punched or drawn sleeve integral with the housing formed by punching or drawing a portion of the housing itself. The invention also contemplates an electrically heatable catalytic converter including at least one terminal as above described.

BRIEF DESCRIPTION OF THE DRAWINGS

The invention may be better understood by having reference to the annexed drawings showing a preferred embodiment of the invention and an alternative embodiment, and wherein:

FIG. 1 is an elevation, partially in cross -section, showing a terminal or electrode in accordance with this invention.

FIG. 2 is an elevation, partially in cross-section showing an alternative form of terminal or electrode in accordance with this invention.

DETAILED DESCRIPTION OF THE INVENTION

Figure 3:
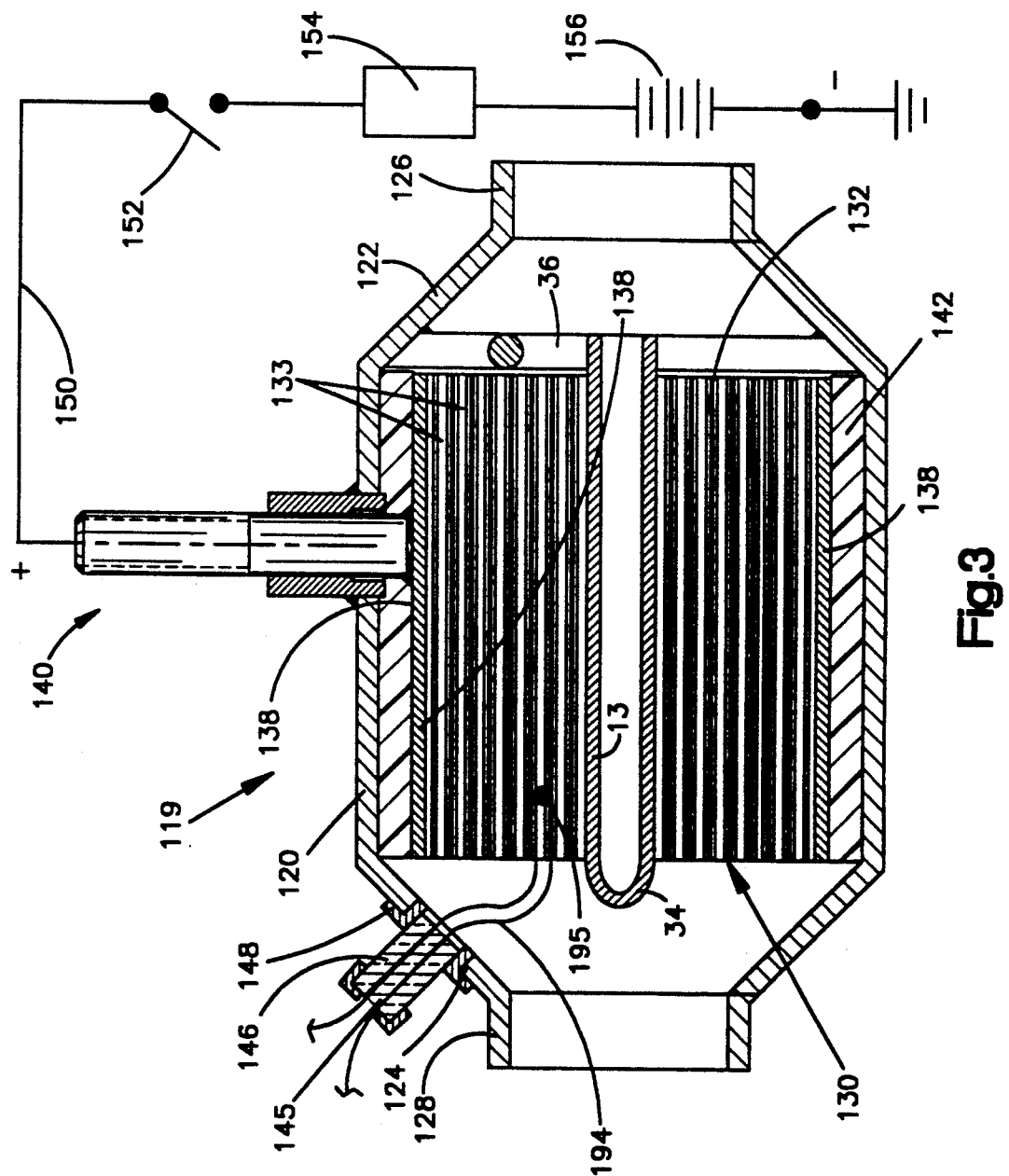
FIG. 3 is a cross-sectional view of an electrically heatable catalytic converter in accordance with this invention.

As indicated above, the present invention is a terminal or electrode especially useful for high temperature service in an electrically heatable catalytic converter. Prior terminal assemblies have been subject to leakage which causes oxygen sensors in the vehicle's emission system to malfunction. The present invention overcomes that problem.

There is shown in FIG. 1, in partial cross-section, a preferred form of terminal or electrode in accordance with this invention. The entire structure is indicated by the numeral 10. The structure 10 includes a stud 12 having a threaded portion 14. This portion enables attachment of a cable from a voltage source, e.g., a 12 volt to 1.08 volt direct current battery, to an electrically heatable catalytic converter as schematically shown in FIG. 3. In the present case, the pole of the direct current voltage source is the positive pole. The stud is preferably nickel of high purity, e.g., 99.5% nickel, although it may be a nickel alloy or ferritic stainless steel. The diameter is generally about 0.365".

The remaining portion of the stud 12, usually about half of the length of the stud, is circumferentially coated with a refractory metal oxide layer 16, which layer 16 is from 0.017" to 0.005" plus or minus 0.002" thick. In the preferred case for a 12 volt to 24 volt voltage source, this layer 16 is 0.010" thick. Best results have been secured when the refractory metal oxide, e.g., alumina, gamma-alumina, alumina/titania, alumina/ceria, titania, titania/ceria, etc., is plasma spray applied. Slight irregularities in the surface can be largely removed by sanding or otherwise abrading the coated surface, e.g., by centerless abrading. The final stud diameter is about 0.365" plus or minus 0.001".

The proximal end 18 of the stud 12 is configured conveniently as on a stud for stud welding, e.g., with a suitably contoured end 20 (FIG. 2), e.g., a conical tip. The final 0.15" of the stud is free of any coating to facilitate welding to the housing 22a of the electrically heatable core 130 (FIG. 3).

To enable mounting of the electrode or terminal 10, there is provided a sleeve 23 which is drawn, and machined or ground so as to provide an interference fit, e.g., a press fit or shrink fit, with the refractory metal oxide coated portion 16 of the stud 12. This fit is air tight. The sleeve 23 is conveniently punched or drawn from the housing 120 (FIG. 3). For convenience, the housing 120 is formed of two half shells, and the punching or drawing operation as well as the emplacement of the coated stud 12 is facilitated, after which the core 130 and the other half shell are applied.

Referring now to FIG. 2, there is provided in this embodiment, a sleeve or collar 22 reamed or otherwise sized for an interference fit with the coated portion 16 of the stud 12. There is conveniently provided a counterbore or recess 24 to space the proximal end 26 of the sleeve 22 from the coated portion 16 to prevent damage when the proximal end 26 is welded to the housing 120 of an electrically heatable catalytic converter as shown, for example, in FIG. 3. To assemble the sleeve 22 to the coated portion 16 of the stud 12, the sleeve 22 is press fitted at room temperature over the coated portion 16. This fit is air tight. The outside diameter (O.D.) of the sleeve in a specific case was 0.63", by 0.75" long. The larger diameter bore was 0.45" and the reamed internal diameter was 0.3826" with an axial length of 0.5".

FIG. 3 shows a complete electrically heatable catalytic converter assembly 119 in cross-section and ready for insertion in an exhaust line of an internal combustion engine. The converter 119 is provided with a stainless steel or nickel housing 120 having flared end caps 122 and 124, and nipples 126 and 128 integral therewith, respectively, adapted to accommodate a standard exhaust pipe, e.g., a 2.5" inside diameter, (I.D.) pipe. The housing contains a core generally indicated at 130. The core 130 of FIG. 3 is characterized by a plurality of generally axially extending cells 133 diagrammatically shown as a plurality of parallel lines. The core 130 is formed of herringbone corrugated thin metal foil strips 132 which are coated with a refractory metal oxide coating having a noble metal catalyst, e.g., platinum, palladium, rhodium, ruthenium or a mixture of two or more of such noble metals, deposited thereon. The gamma form of alumina is preferred as the refractory metal oxide. Other refractory metal oxides are mentioned above.

Strips 132 are secured to a central post 13 as by spot welding. A bullet shaped nose 34 is provided to close the tube 13. The strips 132, which may be uniformly coated strips, or a composite of two or more strips, e.g., corrugated and flat, or corrugated, flat and brazing foil, are tightly spirally wound about the central post 13. The whole spiral bundle is wrapped in brazing foil, and surrounded with a metallic retaining shell 138, desirably as two half shells. One of the half shells has a terminal post generally indicated at 140, having the same structure as generally indicated by the numeral 10 in FIG. 1 or FIG. 2 extending therefrom for attachment of a cable 150 from a suitable voltage source. The half shells are seam welded together, and the assembly induction heated to fuse the brazing foil and braze the distal ends of the foil strips 132 to the inside of the retaining shell 138. Induction heating results in the heat extending only a short distance into the core 130 and does not destroy the catalyst.

The foregoing assembly is then wrapped in ceramic insulation, desirably 1/16" to 1" thick and captured between two half shells which, when seam welded together, form the housing 120. A suitable ceramic felt is described in U.S. Pat. No. 3,916,057 to Hatch dated Oct. 28, 1975. The insulation electrically isolates the core 130 from the housing 120. The end caps 122 and 124 are the last parts to be attached as by welding. A thermocouple having a junction 195 may optionally be placed within the core 130 to sense temperature. The leads 194 pass through an insulator tube 146 (desirably ceramic) in a ceramic sleeve 145 (or another shrink fit/ceramic plasma coated assembly as described herein) and a bushing 148 extending through the end cap 124.

A terminal assembly such as shown in FIG. 1, is, as indicated above, threaded to accept a nut or pair of nuts to hold a cable connector, not shown, from cable 150. The cable 150 is schematically shown, and leads through a switch 152 and power switching means 154, such as described in U.S. Ser. No. 587,219 filed on Sep. 24, 1990, which has been refiled as U.S. Ser. No. 926,045, filed Aug. 5, 1992, pending, commonly owned with the present application and copending herewith. The power switching means 154 is connected to a battery 156 or an alternator, or both, to provide a driving force of 12 volts to 108 volts.

The opposite pole, or pole negative pole in this case, is connected from the housing 120 by a bar 36 welded at each end to the housing 120 and to the central post 13, respectively. The automobile chassis, to which the electrically heatable catalytic converter is attached, is grounded or negatively charged. Thus, the electrical circuit is completed from the central post 13 through the thin metal strips forming the core 130, through the retaining shell 138 and the positive terminal post 140.

The cell density of the core 130 is conveniently in the range of from 50 to 350 cells per square inch, preferably from 160 to 200 cells per square inch.

The catalytic converters hereof are referred to as "electrically heatable." This is to suggest that electrical power is supplied usually for a small portion of the time the engine is either at rest or at start-up, and if necessary, during operation of the engine at any time the temperature falls below a predetermined set point.

What is claimed is:

1. A terminal for an electrical connection extending through a metallic housing and comprising (a) a metallic stud; (b) a ceramic coating about an axially extending portion of said metallic stud; and (c) a metallic sleeve having an interference fit with said axially extending portion of said metallic stud, said metallic sleeve being either an opening drawn from a metallic housing and integral therewith or a collar separate from the metallic housing and welded to said metallic housing, whereby the metallic stud is electrically isolated from said metallic sleeve.

2. A terminal as defined in claim 1 wherein the metallic stud is threaded along the portion free of ceramic coating.

3. A terminal as defined in claim 1 wherein the ceramic coating is a refractory metal oxide housing.

4. A terminal as defined in claim 3 wherein the refractory metal oxide coating comprises alumina.

5. A terminal as defined in claim 3 wherein the refractory metal oxide coating comprises gamma-alumina.

6. A terminal as defined in claim 3 wherein the refractory metal oxide coating comprises a mixture of refractory metal oxides.

7. A terminal as defined in claim 6 wherein the mixture of refractory metal oxides comprises alumina and ceria.

8. A terminal as defined in claim 6 wherein the mixture of refractory metal oxides comprises alumina and titania.

9. A terminal as defined in claim 1 wherein the metallic sleeve is stainless steel.

10. A terminal as defined in claim 1 wherein the metallic stud is nickel.

11. A terminal as defined in claim 1 wherein the ceramic coating is at least 0.01" thick.

12. A terminal as defined in claim 1 wherein the ceramic coating is from 0.017"0 to 0.005" thick plus or minus 0.002".

13. A terminal as defined in claim 1 wherein the metallic stud is threaded along the distal portion, has an axially extending, circumferential ceramic coating comprising alumina along its proximal portion, said axially extending circumferential ceramic coating being at least 0.005" thick, and the metallic stud is nickel.

14. An electrically heatable catalytic converter comprising (1) a housing with two ends, (2) end cap adaptors at each end of said housing for adapting said electrically heatable catalytic converter for insertion in an exhaust line, (3) a core comprising a central post, a plurality of corrugated temperature resistive, corrosion resistant metal foil strips contacting said central post at one end of each of said plurality of corrugated temperature resistive, corrosion resistant metal foil strips, and spirally wound thereabout, a retainer shell or retainer shell portions contacting the opposite ends of said plurality of corrugated metal strips and brazed to said opposite ends; (4) insulation means between the housing and said core; (5) and a terminal as defined in claim 1 secured to said retainer shell or one of said retainer shell portions, and to the housing for connecting said core to one side of a voltage source.

* * * * *